United States Patent [19]
Ernst et al.

[11] 3,973,659
[45] Aug. 10, 1976

[54] FRICTION CLUTCH DISK SPRING AND BEARING ASSEMBLIES

[75] Inventors: Horst Ernst, Eltingshausen; Manfred Brandenstein, Aschfeld; Armin Olschewski, Schweinfurt, all of Germany

[73] Assignee: SKF Industrial Trading and Development Company, B.V., Amsterdam, Netherlands

[22] Filed: May 31, 1974

[21] Appl. No.: 475,192

[30] Foreign Application Priority Data
June 1, 1973    Germany............................ 2327937

[52] U.S. Cl. .............................. 192/89 B; 192/98; 308/233
[51] Int. Cl.² ........................................ F16D 23/14
[58] Field of Search .................. 192/89 B, 99 A, 98

[56] References Cited
UNITED STATES PATENTS

| | | | |
|---|---|---|---|
| 2,700,444 | 1/1955 | Ahlen............................ | 192/89 B X |
| 3,093,228 | 6/1963 | Binder................................ | 192/89 B |
| 3,167,164 | 1/1965 | Bland et al. ........................ | 192/89 B |
| 3,365,040 | 1/1968 | Pitner ................................... | 192/98 |

FOREIGN PATENTS OR APPLICATIONS

| | | | |
|---|---|---|---|
| H19958 | 4/1956 | Germany............................ | 192/89 B |
| 1,810,787 | 7/1970 | Germany ............................. | 192/98 |

*Primary Examiner*—Benjamin W. Wyche
*Attorney, Agent, or Firm*—Murray Schaffer

[57] ABSTRACT

A friction clutch assembly with a clutch release bearing for use with automotive vehicles. The friction clutch is provided with a disc-shaped spring release member having a central bore. The clutch release bearing is formed as a conventional anti-friction bearing having an outer race ring extending through the central bore of the release spring. One end of the outer race ring is formed with an annular flange extending substantially radially outward to contact the exterior frontal face of the spring release member. An angularly-shaped retaining ring is fixed to the portion of the outer race ring extending through the bore and is formed with an axially extending shank wall terminating in a peripheral edge which presses against the opposite interior frontal face of the spring release member.

10 Claims, 2 Drawing Figures

FRICTION CLUTCH DISK SPRING AND BEARING ASSEMBLIES

BACKGROUND OF THE INVENTION

The present invention relates to friction clutch assemblies and in particular to means for securing the clutch release bearing to the spring release member of the friction clutch.

In general friction clutches employ a spring release member comprising a disc-like diaphragm or belleville type spring having a central bore. The spring release member may be formed with a plurality of radial slots arranged about its central bore thereby forming a corresponding number of radially inwardly directed spring release arms. The anti-friction release bearing is mounted in the spring release member so as to be in resilient engagement therewith. In one well known form of construction the anti-friction bearing is provided with a solid or massive outer race ring in which is formed an annular groove. The race ring is adapted to be inserted within the central bore of the spring release member, the resilient arms of which are adapted to snap into the annular groove thus fixing the bearing in its axial direction. These known designs are relatively complicated and therefore expensive to produce. Due to the solid and massive design of the outer race ring the weight of the bearing and thereby also the clutch is substantially increased. Further, the massive outer race ring greatly enlarges the radial extent of the bearing, so that the lever arm or moment for the spring release member is small, therefore requiring high release forces to be exerted on the friction clutch.

It has been attempted, in the known constructions to simplify the installation of the release bearing in the bore of the spring release member, by providing the annular groove in the outer race ring with a relatively low or shallow shoulder over which the spring release arms may easily slide. However, such a shoulder does not extend sufficiently outward in the radial direction to insure the fixing of the bearing in its proper corresponding axial direction particularly during extended periods of operation. Reference can be made to U.S. Pat. No. 2,485,214 and German Pat. No. 1,555,408 for a more detailed description of conventional friction clutch and bearing assemblies.

It is an object of the present invention to provide means for connecting the clutch release bearing and the friction clutch so that the disadvantages and defects of the prior art are overcome.

It is an object of the present invention to provide means for attaching a clutch release bearing to a friction clutch which is relatively simple and of low weight.

It is a further object of the present invention to provide means by which the friction clutch and the clutch release bearing may be simply assembled and may be retained as a unitary assembly for storage and shipment.

It is still another object of the present invention to provide means for connecting the clutch release bearing to the friction clutch so that a secure axial fixation of the bearing in the spring release member is obtained.

The foregoing objects, other objects, together with numerous advantages of the present invention will be apparent from the following disclosure.

SUMMARY OF THE INVENTION

According to the present invention a clutch release bearing for use with a friction clutch for automotive vehicles is provided. The friction clutch employs a disc-shaped spring release member having a central bore. The clutch release bearing is formed as a conventional anti-friction bearing having an outer race ring formed of light weight sheet metal. The outer race ring extends through the central bore of the spring release member and is provided at one end with an annular flange extending substantially radially outwardly and forming a shoulder adapted to lie against one of the frontal face of the spring release member. An angularly-shaped ring is provided for connecting the release bearing to the friction clutch. The angular retaining ring is provided with a slightly conically curved axially extending shank wall and is fastened at its inner periphery to the portion of the outer race ring which extends through the central bore. The curved shank wall extends over the outer surface of the race ring until its free peripheral edge engages the opposite frontal surface of the spring release member thereby sandwiching the spring release member between the radial flange and the retaining ring.

Preferably, the retaining ring is secured within the bore of the outer ring, although it may be secured about the outer surface of the outer race ring. The fastening of the retaining ring and the outer race ring together may be accomplished in conventional manner. The retaining ring may be provided with an axial flange which is forcefit within the outer race ring, it may be provided with spring-like tabs, a bayonet type fastener, or welded to it in a unit. The retaining ring may itself be made out of sheet metal and may be drawn or pressed into its angular shape. Preferably, the axially extending wall is somewhat conically formed to provide a certain degree of resiliency and to enable it to fit over and engage the interior surface of the spring release member.

In accordance with further aspect of the present invention the axially extending shank wall of the retaining ring, is formed of somewhat conical cross section, and is provided with a plurality of axially directed slits spaced about its periphery. The axial slits separate the shank wall into one or more resilient-like fingers which can resiliently press against the frontal face of the spring release member thereby pressing the same against the radial flange formed as an integral unitary part of the outer race ring. Because of the slight conical formation of the shank wall, and through the assistance of the axially directed slits, the retaining ring may be easily inserted and installed in place together with the installation of the release bearing in the central bore of the spring release member. The retaining ring is first secured to the end of the outer race ring and when axially inserted through the central bore of the spring release member resiliently contracts in the radial direction until it passes behind the spring release member where it again expands radially outward into its original shape. Thereafter its peripheral edge presses against the surface of the spring release member fixing both the release bearing and the retaining ring in the axial direction. The conical angle of the shank wall of the retaining ring can be so formed that so great a resilient force is obtained that the assembly will be maintained in its fixed axial position even under the most strenuous operating forces exerted during the use of the assembly.

In a further aspect of the present invention the release bearing may be fixed against rotational movement relative to the spring release member by providing the free peripheral edge of the shank wall with one or more projections or tabs which extend radially into corresponding holes or slots formed in the spring release member. These holes or slots can be formed in the spring arms themselves or may be defined as the radial slits forming adjacent arms.

Full details of the present invention are set forth in the following description of its preferred embodiment and is shown in the accompanying drawings.

DESCRIPTION OF THE INVENTION

Figure 1:
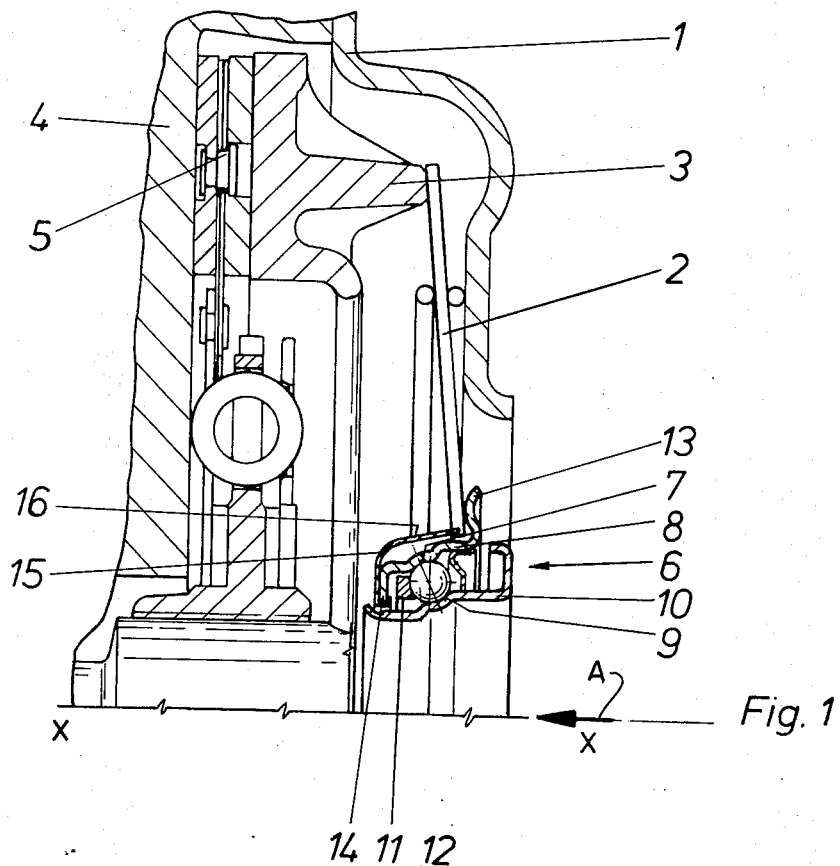
FIG. 1 is a sectional view through a friction clutch showing the connection of the release bearing in accordance with the present invention.

In the friction clutch depicted in FIG. 1 there is arranged within an outer housing 1 a disc-like spring release member 2. The spring release member may be a disc-shaped diaphragm or cup-like washer of the belleville type and may be provided with a plurality of radial slits forming a plurality of spring release arms. The outer peripheral edge of the spring release member 2 bears against an annular axially extending edge 3 of a pressure plate. Arranged between the pressure plate 3 and a driven plate 4 is a clutch plate 5. A clutch release bearing, generally depicted by the numeral 6 extends through the central bore of the spring release member 2 and is attached thereto in accordance with the present invention. A non shown actuating lever is adapted to contact the release bearing. By means of the axial movement of the release bearing 6, the spring release member 2 causes the clutch plate 5 to be detached from the driven plate 4 and thus effect the clutch release operation.

In accordance with the present invention, the clutch release bearing 6 comprises an outer race ring member 8, and generally opposite thereto an inner race ring member 10 providing the outer race surface 7 and the inner race surface 9 a plurality of rolling elements such as balls 12 arranged in a cage 11. The outer race ring 8 is formed of sheet metal and is bent so as to have a cup-shaped cross section terminating at one end in a radially outwardly directed flange 13 which is curved so as to form a shoulder serving to engage the frontal face of the spring release member 2. The opposite end of the outer race ring is formed with a radially inwardly directed flange 14 which terminates adjacent an axial extension of the inner race ring 10. The release bearing is otherwise formed as a conventional anti-friction bearing and may be provided with the usual lubricant, seal means, etc.

Secured to the inwardly directed flange 14 of the outer race ring 8 is an angularly shaped annular retaining ring 15. The annular retaining ring 15 is secured, in conventional manner along its inner peripheral edge to the radially inwardly directed flange 14 and extends outwardly therefrom in a slightly conically shaped shank wall 16, assuming the general shape of a cup. The slightly conically formed shank wall 16 extends so that its outer peripheral frontal edge 17 lies against the interior frontal face of the spring release member 2, opposite to the face against which the radially outer directed flange 13 lies and thus fixes the bearing together with the flange 13 in the axial direction wherein the spring release member 2 is sandwiched between the frontal end 17 and the shoulder formed on the flange 13.

Figure 2:
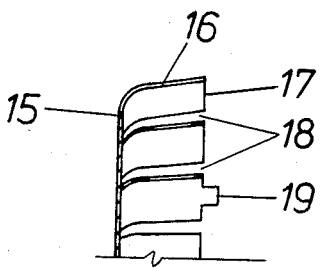
FIG. 2 is a similar sectional view enlarged of the retaining ring.

The retaining ring 15 may be welded or otherwise fixed to the flange 14 to form a unit with the outer race ring 8. The shank wall 16 may be formed as a unitary annulus. However, as seen in FIG. 2 this wall may be preferably provided with several axially extending slits 18 spaced about its circumference. These slots provide several corresponding resilient finger-like portions of the shank wall 16. It is thereby possible to axially insert the release bearing and the attached retaining member through the central bore of the spring release member, by pushing the unit in the direction indicated by the arrow A shown in FIG. 1. The slightly conically formed shank wall of the retaining ring would be radially compressed during such passage. As soon as the frontal edge 17 moves behind the rear frontal face of the spring release member 2 the resilient arm portions of the shank wall 16 snap outwardly resuming their normal position. As a result the spring release member is clamped between the frontal edge 17 and the radially outwardly extending flange 13 to securely fasten the release bearing on the spring release member 2.

To insure the securement of the bearing against rotational movement relative to the spring release member the frontal edge 17 of the shank wall 16 is provided, as seen in FIG. 2, with one or more projections 19 which extend axially outward. These projections extend within a corresponding opening or slot formed in the spring release member 2. If desired the slots receiving the projections 19 may also be those slots forming the radial spring arms of the spring release member. It will be seen from the foregoing description of the embodiment of the present invention that the various objects and advantages enumerated earlier are obtained. Various modifications, changes and embodiments have been suggested earlier in the present disclosure. Other such changes and modifications will be obvious to those skilled in the present art. Further, various means may be employed to obtain the basic concept and principles of the present invention all as indicated herein. It is therefore intended that the present disclosure be taken as illustrative only and not limiting of the scope of the present invention.

What is claimed is:

1. An assembly of a clutch release bearing and a friction clutch having an annular spring release member formed with a central bore, said clutch release bearing comprising an inner ring, an outer race ring and a plurality of rolling bodies located therebetween, said outer race ring having an axial portion extending through said central bore into said spring release member, said outer race ring being integrally formed at its exterior end with a radially outwardly extending flange forming an annular shoulder engaging the exterior surface of said spring release member, and a shaped retaining ring adapted to be secured along its inner periphery to said outer race ring within the interior of said spring release member, said retaining ring having an axially directed wall extending over the surface of said outer race ring terminating in a peripheral edge engaging the interior frontal surface of said spring release member.

2. The assembly according to claim 1 wherein said axially extending wall of said retaining ring is slightly conical in cross section.

3. The assembly according to claim 1 wherein said retaining ring is cup-shaped.

4. The assembly according to claim 1 wherein said retaining ring is securely fixed to the outer race ring of said clutch release bearing to form a unitary assembly therewith.

5. The assembly according to claim 4 wherein the inner peripheral edge of said retaining ring is secured within the bore of a outer race ring.

6. The assembly according to claim 1 wherein said axially extending wall of said retaining ring is provided with one or more axially extending slots defining resilient fingers thereof.

7. The assembly according to claim 1 wherein the peripheral edge of said retaining ring is provided with one or more projections adapted to engage corresponding opening in the spring release member.

8. The assembly according to claim 1, wherein said outer race ring is formed of sheet metal.

9. The assembly according to claim 1, wherein said retaining ring is formed of sheet metal.

10. The assembly according to claim 1, wherein said retaining ring is formed with a radially inward directed flange, said flange being secured to the interior end of said outer race ring.

* * * * *